No. 735,242. PATENTED AUG. 4, 1903.
W. H. GILBERT.
ROD OR PIPE COUPLING.
APPLICATION FILED MAY 16, 1903.
NO MODEL.
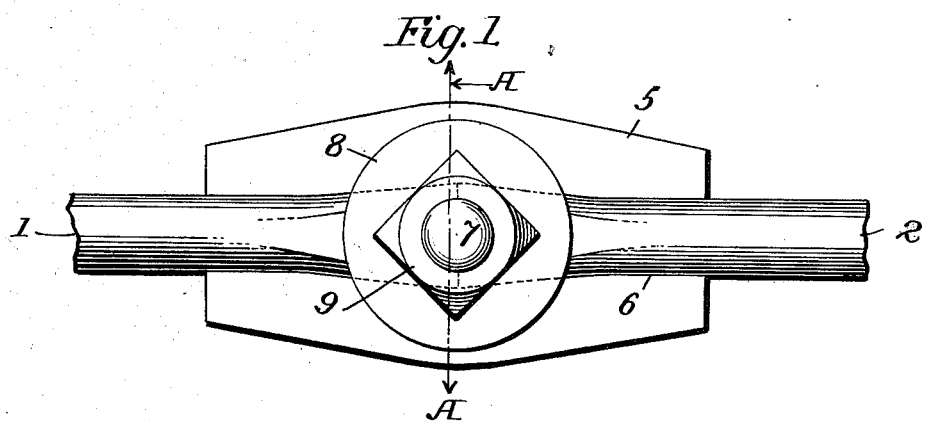
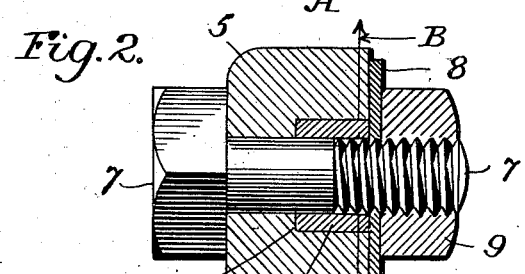
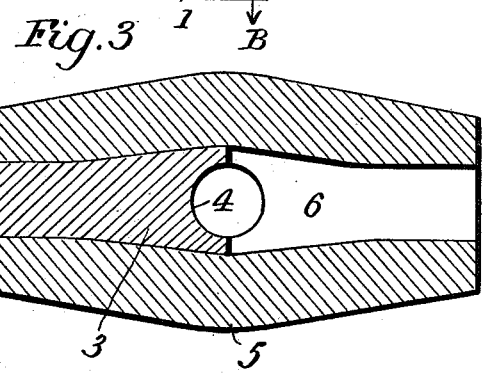
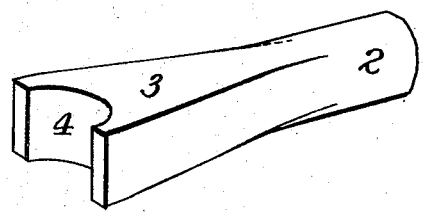
Witnesses
Inventor
William H. Gilbert
Attorneys No. 735,242. Patented August 4, 1903.

UNITED STATES PATENT OFFICE.

WILLIAM H. GILBERT, OF TOLEDO, OHIO.

ROD OR PIPE COUPLING.

SPECIFICATION forming part of Letters Patent No. 735,242, dated August 4, 1903.

Application filed May 16, 1903. Serial No. 157,427. (No model.)

*To all whom it may concern:*

Be it known that I, WILLIAM H. GILBERT, a citizen of the United States, residing at Toledo, in the county of Lucas and State of Ohio, have invented certain new and useful Improvements in Rod or Pipe Couplings, of which the following is a specification.

The present invention relates to improvement in means for coupling together sections of rod or pipe such, for example, as are employed in transmitting power in connection with oil-well pumping apparatus.

The object of the invention is to provide a coupling by which two rod-sections can be quickly and securely connected and in which there will be no danger of the coupling being destroyed by reason of the portion of either rod engaged by the coupling breaking from the body of the rod.

In the accompanying drawings, Figure 1 is a face view of a coupling constructed in accordance with the present invention. Fig. 2 is a sectional view on the line A A of Fig. 1. Fig. 3 is a similar view on the line B B of Fig. 2 with the fastening bolt and nut and one of the rod-sections removed. Fig. 4 is a detail view of the end of one of the rod-sections to which the coupling may be applied. Fig. 5 is a similar view of a slightly different form.

Referring to the drawings, in which like numerals of reference designate corresponding parts in the several figures, 1 2 designate two sections of rod or pipe to be joined or connected. As shown, each of said sections is provided at its ends with enlarged tapering portions 3, in the end of which is formed a recess or socket 4. A coupling-block 5 is provided with a longitudinally-extending groove 6, the diameter or width of which gradually increases from both ends toward the middle, thus providing two seats, each conforming to the shape of the enlarged end sections 3 of the rods 1 2. In the coupling-block, in alinement with the circular space formed by the meeting ends of the rod 1 2 when in place therein, is formed an aperture or passage, through which is passed the stem of a bolt 7. A washer 8 is slipped over the end of said bolt that projects beyond the grooved face of the coupling-block and bears against said face on opposite sides of the groove therein. As shown, the sections of the rods within the coupling are preferably made of the same thickness as the depth of the groove 6, so that said washer also bears against the outer faces or surfaces of both said rod-sections 3. The washer is forced close against the coupling and the rods 1 2 and held in such position by a nut 9. It will be noticed that each of the rods has a relatively long section in contact with the coupling-block, so that the pull or strain exerted upon said rods when in use is not taken entirely by a relatively small laterally-projecting flange, as has been customary in the couplings heretofore in use—that is, the long tapering sections or heads 3 on the engaged ends of the rods afford a firm and durable connection between said rods and the coupling-block 5. The groove or grooves in the coupling-block is of such form that while the enlarged ends of the rods can be readily slipped therein when moved in a direction parallel to the length of bolt 7 they cannot move longitudinally therein or in the direction in which power is applied to and by the rods. The inner concaved ends of the tapered heads 3 preferably abut and closely surround the bolt 7.

If desired, the outer grooved face of the coupling and the sections of the rods therein may be covered by a plate secured in position by the bolt 7 and nut 9; but it is believed that the washer 8, which bears against both the coupling-block and the rods therein, will afford ample protection against the rods becoming displaced from the block in that direction. The close contact between the rods and coupling-block throughout the entire length of the latter would of itself probably prevent any such movement of the rods relative to the block, but the bolt 7, washer 8, and nut 9 are added as an additional fastening.

If desired, the enlarged tapering heads 3 on the rod-sections need not be grooved on their adjacent ends, but may have the form shown in Fig. 5. In this case the adjacent ends of the coupled rods will not abut, but the coupling will firmly connect them.

Having thus described the invention, what is claimed, and desired to be secured by Letters Patent, is—

1. The combination of two rods or pipes having enlarged, tapering heads at their adjacent ends, a coupling-block having in one face a groove having an enlarged reversely-tapered groove to provide seats adapted to receive the tapered heads on said rods and prevent longitudinal movement of said rods relative to the coupling-block, and means for preventing movement of said rods laterally from said groove comprising a securing pin or bolt extending through the block between the adjacent ends of the rods.

2. The combination of two rods or pipes having enlarged heads at their adjacent ends, said heads being tapered or reduced gradually from their free ends toward the rods and each having a recess or notch formed in its free end, a coupling-block provided with a longitudinal groove or passage which is widest at the middle of the block and decreases gradually in width from the middle toward both ends, thus providing two oppositely extending tapering seats in which the tapered heads of the rods or pipes to be coupled fit closely, a bolt extending through a passage in the coupling-block and through the space formed by the notches in the meeting ends of said rods, a disk or plate bearing against the grooved face of the coupling-block, and a nut on the bolt and holding said disk or plate in position.

In testimony whereof I have signed my name to this specification in the presence of two subscribing witnesses.

WILLIAM H. GILBERT.

Witnesses:
MARGARET GILBERT,
C. C. WHITMORE.